Aug. 29, 1939.  E. H. PIRON  2,171,069
TRUCK AND SWING BOLSTER CONSTRUCTION
Filed May 31, 1935  2 Sheets-Sheet 1
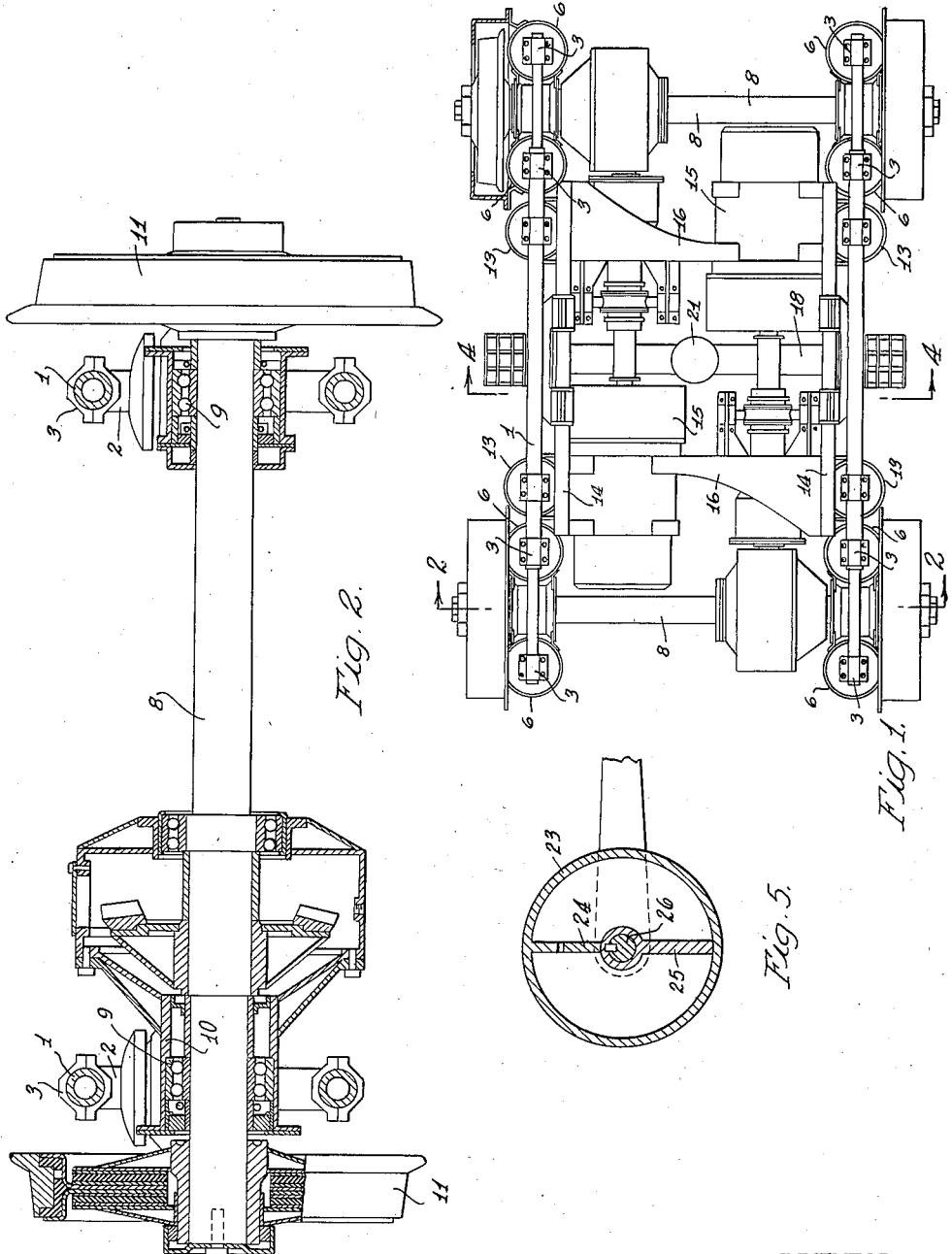
INVENTOR.
Emil H. Piron
BY
J. Windsor Davis
ATTORNEY.

Aug. 29, 1939.  E. H. PIRON  2,171,069
TRUCK AND SWING BOLSTER CONSTRUCTION
Filed May 31, 1935   2 Sheets-Sheet 2
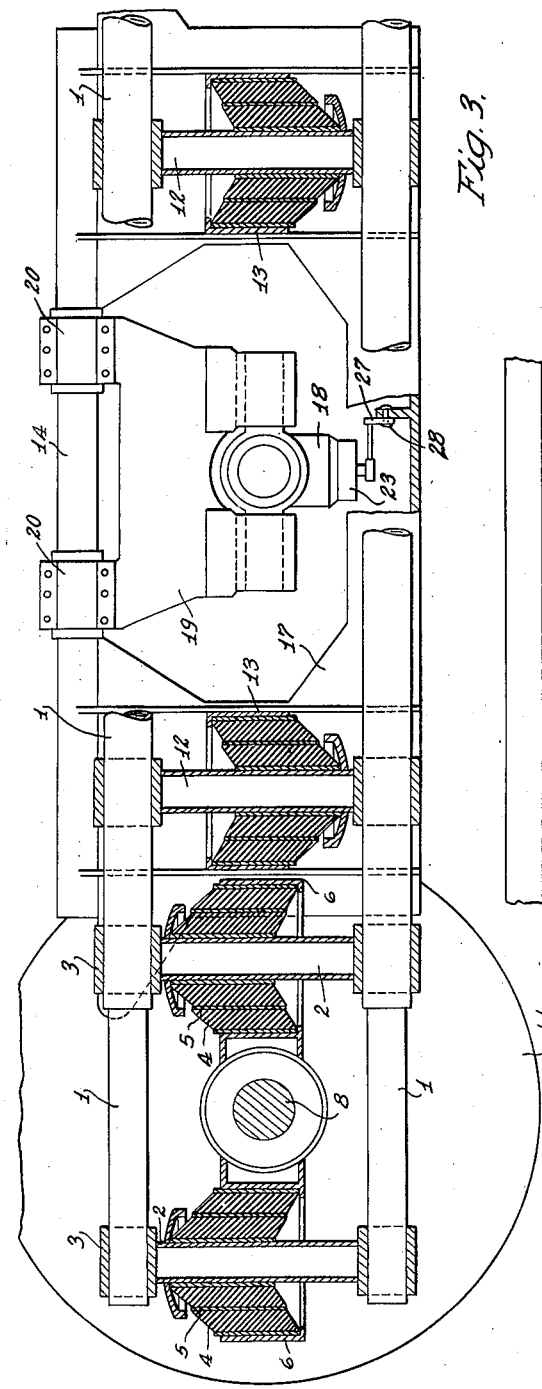
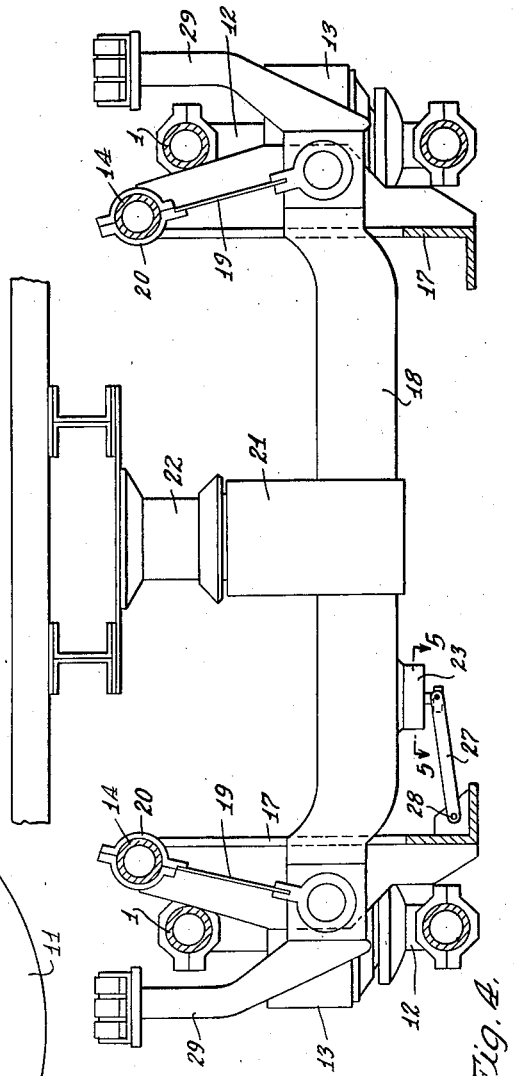
INVENTOR.
Emil H. Piron
BY
J Windsor Davis
ATTORNEY.

Patented Aug. 29, 1939

2,171,069

UNITED STATES PATENT OFFICE 2,171,069

TRUCK AND SWING BOLSTER CONSTRUCTION

Emil H. Piron, New York, N. Y., assignor, by mesne assignments, to Transit Research Corporation, New York, N. Y., a corporation of New York Application May 31, 1935, Serial No. 24,191

4 Claims. (Cl. 105—190)

This invention relates to a swing bolster system for a rail vehicle and has for its object to teach the construction and arrangement thereof to give improved riding qualities. This application is a continuation in part of my co-pending application Serial Number 753,734 filed November 19, 1934.

The conventional type of swing bolster construction may be briefly described as follows: A bolster is swingably suspended by swing links from frame side rails in such manner that it is free to swing in a direction transversely of the direction of travel. It is sufficiently loose to slide in a longitudinal direction for contact with one side wall or the other of a transom when acceleration or deceleration of the body is transmitted through such wall. There is no mechanical member other than sliding surfaces to take care of this lost motion with the result that the looseness soon becomes excessive, friction and wear are excessive, in the articulation and there is a total lack of control of friction damping in the lateral oscillation of the bolster. In addition, the friction damping thus introduced in the motion of the swing links is maximum at points of reversal of the motion of the oscillations when the speed of oscillation is zero and minimum in the middle of the oscillating motion when the speed of oscillation is maximum. As a result, at the points of reversal of lateral swinging motion there is a reversal of lateral friction forces which causes violent lateral impulses affecting the car body. Spring pressed friction means for damping the lateral swinging have been suggested and are sometimes used. The amount of damping depends largely on the change of relative position of the transom and bolster at the moment of damping, the amount of friction in the bearings and the length of the links. With any friction dampener the greatest resistance is offered to initial movement and the resistance decreases according to the speed of the subsequent movement, as aforementioned, and hence the addition of friction dampeners to the damping imparted by the friction of the bearings only gives damping of the same order and small vibrations are therefore transmitted undamped.

It is therefore among the objects of this invention to provide a swing bolster system in which proper mechanical designs at points of articulation may be employed (1) to take care of the particular movements for which they are intended without any clearances which permit secondary motions in other directions, in other words, to provide what may be aptly termed a non-clearance truck wherein the movements of all parts are specifically provided for rather than left, in part, to lost motion arrangements. The motions to be provided for are the swinging oscillations of the body in a direction transversely of the direction of travel, polar motions of the truck with respect to a horizontal axis at right angles to the track, and polar motions around a vertical axis passing through the center of the truck; (2) to take care of the transmission of accelerating and decelerating forces in the direction of travel; (3) to take care of the damping of the transversal swinging motion in such manner that such damping does not set up sharp impulses for transmission to the car body. This last requirement includes the reduction of friction to a minimum by well designed and well lubricated bearings, the elimination of lost motion connections, and the elimination of friction dampers in favor of dampers which will offer a resistance according to the rate of speed of swinging of the bolster.

An ordinary viscous shock absorber or motion damping means will offer a resistance proportional to the square of the speed of motion and this is the type device which I recommend using. However, it must be realized that whereas in vertical springing the track furnishes a solid foundation, there is no solid foundation to resist the damping of lateral forces in a moving vehicle. This must be done between a moving body and the truck frame, and the frame can be readily displaced in a transverse direction because of rotation of the wheels causing contact of the wheel flanges with the rails. Good riding quality is impaired every time the wheel flanges contact a rail and in the case of a conventional truck motion dampers or shock absorbers may therefore very possibly do more harm than good. The base for the motion damper is thus an important part of the bolster system in which damping is to be introduced and it is therefore an object to teach the provision of a proper base (or truck proper) from which viscous damping may be successfully accomplished. As will be hereinafter seen this entails the use of a stiff frame and preferably journal bearings of the type wherein the axles are supported against axial sliding movements in combination with swing links and articulations as hereinbefore mentioned. Damping can then be accomplished by making the resistance approximately proportional to the square of the speed of motion in the direction of swinging.

Other objects and advantages will become hereinafter more fully apparent as reference is had to the accompanying drawings in which Figure 1 is a plan view of a truck built in accord with my invention, Figure 2 is a cross section taken along the line 2—2 of Figure 1, Figure 3 is a partial side view of the truck of Figure 1 with the wheels removed and the springs in section, Figure 4 is a cross section taken along the line 4—4 of Figure 1 without the motors and propeller shafts, and Figure 5 is a section taken along the line 5—5 of Figure 4 showing the vibration damper.

1 indicates the side rails of the main truck frame, there being two on each side which are maintained in vertically spaced relation by tubular members 2 which are clamped thereto and longitudinally adjustable with respect thereto by virtue of the clamp plates 3. The members 2 each constitute the inside main member of an elastic spring composed of alternate cylindrical layers of rubber, or its equivalent 4, and metal or its equivalent 5, inserted in and supported by cylindrical member. The cylinders 6 are joined together in pairs by journal bearing housings 7 and serve to support the frame from the axles 8 with substantial vertical and restricted fore and aft resiliency.

In Figure 2 the axle assembly is illustrated as including journal bearings 9 and journals 10 of such type that the axle 8 is maintained against relative axial sliding motion with respect to its bearings so that the springs 2, 4, 5, 6 also serve to provide for resiliently resisting all lateral motion of the main truck frame with respect to the axles. I have therefore provided what is termed a non-clearance truck with respect to the journal and axle assembly. The axles 8 are supported by the wheels 11.

Between the side girders 2 are further tubular members 12 which constitute inside main members for elastic springs substantially identical with the journal springs but reversed in position, or upside down, with respect thereto. The outer cylinders 13 of these springs are fixedly secured to the secondary frame which is composed of the side girders 14, the motors 15, cross members 16 and plates 17, all in rigid assembly. All relative movement of the secondary frame with respect to the main frame is therefore yieldingly resisted.

A bolster 18 is universally connected at each end to swing links 19 journalled at 20 on the girders 14 of the secondary frame. A center pin member 21 is integrally secured to the bolster for swivel connection with a body member 22. The two bearings 20 are correctly fitted so that they have no axial movement with respect to the girders 14. The swing links therefore have sufficient strength and stiffness to transmit accelerations and decelerations between the car body and the frame. The car body is largely supported on the pedestals 29 integral with the bolster 18, there being no clearance at any time between these pedestals and the car body.

The frame girders and the entire truck is of sturdy construction and the bolster is therefore suspended on a firm base which does not include lost motion connections nor free clearances at any point. It is therefore a proper support for a viscous vibration damping device for swinging movements of the bolster. One way of affecting the damping is by means of a fluid cylinder or dashpot 23 attached to the bottom of the bolster 18. This device may be a conventional type hydraulic shock absorber having a ported fixed vane 24 adapted to vent fluid through the port upon oscillation of the vane 25. The shaft 26 of the vane 25 is secured to the arm 27 pivotally attached at 28 to the truck frame. It is illustrated as being suitably secured to the plate 17. While more than one damper 23 may be used, it has been satisfactory to employ a single one for each bolster, it being of the double acting type offering identical resistance to movement in either direction.

What I claim is:

1. In a rail truck, the combination of a truck frame, axles, journal bearings for said axles, and elastic cushioning means between said journal bearings and said frame yieldingly resisting all relative lateral, fore and aft and vertical movements thereof, a swing bolster, swing links for supporting said bolster from said frame, said swing links being constructed and arranged to transmit all accelerating and decelerating forces between said frame and a car body thereabove, and viscous shock absorbing means between said bolster and said frame adapted to resist all swinging movements of said bolster.

2. The combination as set forth in claim 1 wherein the resistance offered by said shock absorbers is proportional to the square of the speed of the swinging movements of said bolster.

3. In a rail truck, the combination of a truck frame, axles, elastic journal springs for supporting said frame from said axles, a bolster having swing links journalled on said frame, said bolster having a center bearing construction and pedestals at the end thereof for sustaining the weight of a car body, said pedestals and said car body being in contact at all times whereby said body swings and rolls with said bolster, said swing links being fixed against axial sliding movement on said frame whereby said links transmit all accelerating and decelerating forces to and from said car body, and viscous motion damping means between said bolster and said frame.

4. The combination of a truck comprising axles, a stiff main frame, elastic springs between said axles and said frame yieldingly resisting all relative horizontal and vertical movements thereof, a secondary frame, elastic springs supporting said secondary frame from said main frame and yieldingly resisting all relative movements thereof, a swing bolster and swing links connecting said bolster and said secondary frame and adapted to transmit all driving and retarding forces to and from a car body carried by said bolster, and viscous motion damping means connected to said bolster and said main frame.

EMIL H. PIRON.